UNITED STATES PATENT OFFICE.

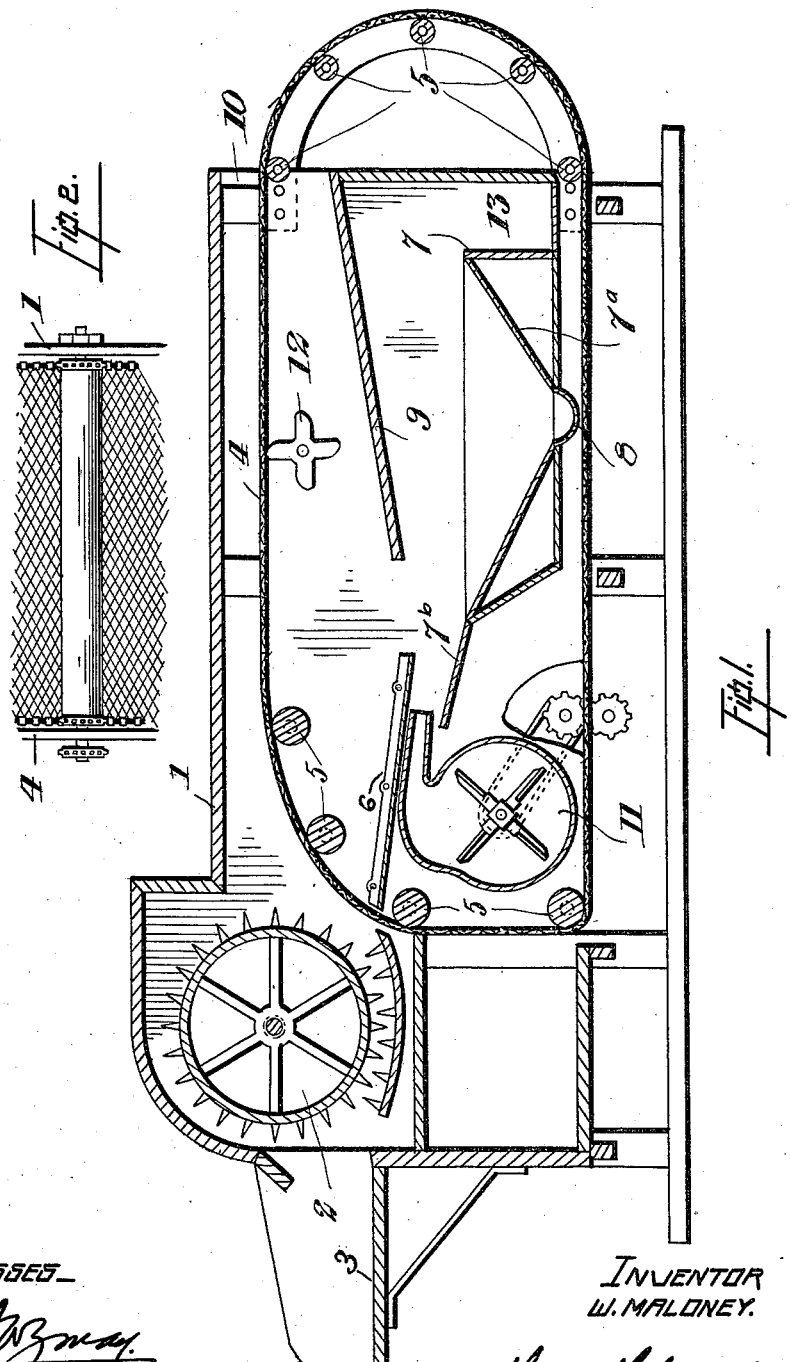

WILLIAM MALONEY, OF OTTAWA, ONTARIO, CANADA.

THRESHER.

1,059,743.  Specification of Letters Patent.  Patented Apr. 22, 1913.

Application filed June 5, 1912. Serial No. 701,775.

*To all whom it may concern:*

Be it known that I, WILLIAM MALONEY, a subject of the King of Great Britain, residing at 221 Somerset street east, in the city of Ottawa, Province of Ontario, Dominion of Canada, have invented certain new and useful Improvements in Threshers, of which the following is a specification.

My invention relates to improvements in threshers and the object of the invention is to devise a thresher which will be more simple and effective than those hitherto in use.

A further object is to construct a thresher which would be of sufficiently light weight as to be portable from place to place much more easily than the threshers at present in use.

The invention consists of a casing carrying a thresher cylinder of the usual form, and endless perforated belt mounted on suitable rollers on the side of the threshing cylinder remote from where the sheaves are introduced into the machine, an inclined chute within the endless belt and adjacent to the threshing cylinder, a receptacle within the belt having a suitable flange extending under the inclined chute, a blower fan underneath the inclined chute, a second inclined chute inclined oppositely to the aforesaid chute and designed to catch the grain which would not fall on the aforesaid chute, a delivery trough at the bottom of the receptacle and means for driving the belt, all as hereinafter more particularly described and illustrated in the accompanying drawing in which:

Figure 1 represents a longitudinal section of a thresher constructed according to my invention. Fig. 2 is a cross sectional detail showing a portion of the belt.

Like characters of reference indicate corresponding parts in all the figures.

1 is the casing.

2 is the threshing cylinder.

3 is the platform into which the sheaves are introduced.

4 is an endless perforated belt constructed of suitable material and the perforations therein being of suitable gage. It may be found preferable to construct the belt of wire mesh.

5 are rollers on which the belt is mounted.

6 is the inclined chute within the endless belt and adjacent to the threshing cylinder.

7 is a receptacle for receiving the grain having inclined walls 7ª and a flange portion 7ᵇ designed to extend under the inclined chute 6.

8 is a delivery trough at the bottom of the receptacle.

9 is a chute inclined oppositely to the aforesaid chute 6.

10 is an aperture at the end of the thresher casing remote from the cylinder through which the straw passes out of the machine.

The operation of the machine is as follows: The sheaves are introduced into the machine from the platform 3 passing down around the threshing cylinder 2 and the grain is thrown against the perforated belt through which it falls onto the chute 6 from whence it is directed into the receptacle 7. It is then delivered to the trough 8. The coarser straw in the meantime not being able to get through the perforations in the belt is carried on the top of the same out through the aperture 10 where it falls onto the ground. The blower fan 11 blows the chaff and fine straw which has come through the belt into the spout 13 from whence it is carried out through the side of the machine while the grain falls down into the receptacle from the chute 6.

12 is a beater for vibrating the belt 4.

It will be seen that a device constructed according to my invention will be simple and effective and can be cheaply manufactured. It will also be much lighter than the threshers at present on the market and hence will be much more portable. Further the advantage of the present device is that the thresher can be put on a truck and taken to the shock instead of having to carry the grain to the thresher as is usually the case.

What I claim as my invention is:

1. In a thresher, a revolving endless belt having perforations therein of suitable gage, rollers on which the belt is mounted, said belt being mounted on the side of the threshing cylinder remote from where the sheaves are introduced and inclined chutes inside the belt and adjacent to the threshing cylinder for receiving the grain thrown through the belt, means for driving the belt and means for connecting the grain from the chutes.

2. In a thresher, a revolving endless belt having perforations therein of suitable gage, rollers on which the belt is mounted, said belt being mounted on the side of the threshing cylinder remote from where the sheaves are introduced and inclined chutes inside the belt and adjacent to the threshing cylinder for receiving the grain thrown through the belt, means for driving the belt, and a receptacle inside the belt having a flange extending under the inclined chutes and a trough for delivering the grain, as and for the purpose specified.

3. In a thresher, a revolving endless belt having perforations therein of suitable gage, rollers on which the belt is mounted, said belt being mounted on the side of the threshing cylinder remote from where the sheaves are introduced and inclined chutes inside the belt and adjacent to the threshing cylinder for receiving the grain thrown through the belt, means for driving the belt, a receptacle inside the belt having a flange extending under the inclined chutes, a trough for delivering the grain, a blower fan underneath the inclined chutes having a nozzle turned horizontally in the direction of the receptacle and a spout into which the chaff and fine straw is blown separating same from the grain, as and for the purpose specified.

4. A thresher comprising an endless perforated belt, rollers on which the belt is mounted, means for rotating the belt, an inclined chute within the endless belt and adjacent to the threshing cylinder, a receptacle for receiving the grain from the chute, a delivery trough at the bottom thereof, a flange formed on the side of the receptacle and extending under the inclined chute, a blower fan having a nozzle between the inclined chute and the aforesaid flange and an oppositely inclined chute for directing the grain into the receptacle which does not fall onto the aforesaid inclined chute.

In witness whereof I have hereunto set my hand in the presence of two witnesses.

WILLIAM MALONEY.

Witnesses:
PEARLE M. GARROW,
BERTHA A. LEAMY.

---

Copies of this patent may be obtained for five cents each, by addressing the "Commissioner of Patents, Washington, D. C."